United States Patent
Mullett

(10) Patent No.: US 10,703,171 B2
(45) Date of Patent: Jul. 7, 2020

(54) HVAC AIRFLOW CONTROL SYSTEM

(71) Applicant: DENSO International America, Inc., Southfield, MI (US)

(72) Inventor: Reilly Mullett, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 256 days.

(21) Appl. No.: 15/669,497

(22) Filed: Aug. 4, 2017

(65) Prior Publication Data

US 2019/0039436 A1 Feb. 7, 2019

(51) Int. Cl.
*B60H 1/00* (2006.01)

(52) U.S. Cl.
CPC ..... *B60H 1/00842* (2013.01); *B60H 1/00807* (2013.01)

(58) Field of Classification Search
CPC .................. B60H 1/00842; B60H 1/00807
USPC .......................................................... 454/75
See application file for complete search history.

(56) References Cited

U.S. PATENT DOCUMENTS

| 6,386,965 | B1* | 5/2002 | Greenwald | ........ | B60H 1/00742 |
| | | | | | 165/41 |
| 7,013,967 | B2* | 3/2006 | Kondo | ............... | B60H 1/00064 |
| | | | | | 165/203 |

| 2009/0031741 | A1 | 2/2009 | Hara et al. | | |
| 2013/0231035 | A1* | 9/2013 | Desmarais | ........... | B64D 13/006 |
| | | | | | 454/75 |
| 2014/0373563 | A1* | 12/2014 | Mizutani | ............ | B60H 1/00807 |
| | | | | | 62/186 |
| 2015/0057811 | A1 | 2/2015 | Fan et al. | | |

FOREIGN PATENT DOCUMENTS

CN 102519115 A 6/2012

* cited by examiner

*Primary Examiner* — Helena Kosanovic
(74) *Attorney, Agent, or Firm* — Harness, Dickey & Pierce, P.L.C.

(57) ABSTRACT

A heating, ventilation, and air conditioning (HVAC) system. An HVAC unit of the system includes a heater core, an evaporator, a plurality of mode doors that control airflow from the HVAC unit, and one or more actuators, each one of the one or more actuators moves one or more of the plurality of mode doors. A plurality of airflow sensors are each associated with a different one of a plurality of air duct outlets through which airflow from the HVAC unit flows. The plurality of airflow sensors measure airflow through each one of the plurality of air duct outlets. A control module determines airflow amount through each one of the plurality of air duct outlets based on inputs received from the sensors, and moves one or more of the plurality of mode doors until airflow amount measured by the plurality of airflow sensors is at least substantially equal to a requested airflow distribution pattern.

5 Claims, 4 Drawing Sheets

HVAC AIRFLOW CONTROL SYSTEM

FIELD

The present disclosure relates to airflow control for a heating, ventilation, and air conditioning (HVAC) system.

BACKGROUND

This section provides background information related to the present disclosure, which is not necessarily prior art.

Current heating, ventilation, and air conditioning (HVAC) systems include an HVAC case that houses a heater core and an evaporator. The HVAC case defines a plurality of case outlets through which airflow exits the HVAC case. Each one of the case outlets is typically connected to an air duct, which terminates at an air duct outlet arranged at a location where airflow is desired.

Existing HVAC cases include a plurality of mode doors, which are movable to control airflow through the different HVAC case outlets. Each one of the mode doors is typically moved by way of a series of linkages. With existing HVAC systems, manufacturers design and assemble the mode door linkages to position the mode doors at predetermined angles at each mode (e.g., face, foot, defrost, etc.) to provide a predetermined amount of airflow through one or more of the HVAC case outlets. The end user cannot customize the airflow distribution for the different modes because the airflow is set by a manufacturer/designer of the HVAC system, and/or a manufacturer of a vehicle for which the HVAC system is intended for.

While current HVAC systems are suitable for their intended use, they are subject to improvement. For example, current mode door linkages are complicated to design given varying customer requirements and dedicated designs. Furthermore, current mode door linkages can be noisy, and cannot provide customizable airflow distribution. The present teachings advantageously provide for improved HVAC assemblies that provide enhanced comfort to vehicle occupants, such as by allowing the occupants to vary the airflow distribution for each mode setting. The present teachings provide for numerous additional advantages as explained herein, and as one skilled in the art will appreciate.

SUMMARY

This section provides a general summary of the disclosure, and is not a comprehensive disclosure of its full scope or all of its features.

The present teachings provide for a heating, ventilation, and air conditioning (HVAC) system. An HVAC unit of the system includes a heater core, an evaporator, a plurality of mode doors that control airflow from the HVAC unit, and one or more actuators, each one of the one or more actuators moves one or more of the plurality of mode doors. A plurality of airflow sensors are each associated with a different one of a plurality of air duct outlets through which airflow from the HVAC unit flows. The plurality of airflow sensors measure airflow through each one of the plurality of air duct outlets. A control module determines airflow amount through each one of the plurality of air duct outlets based on inputs received from the sensors, and moves one or more of the plurality of mode doors until airflow amount measured by the plurality of airflow sensors is at least substantially equal to a requested airflow distribution pattern.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
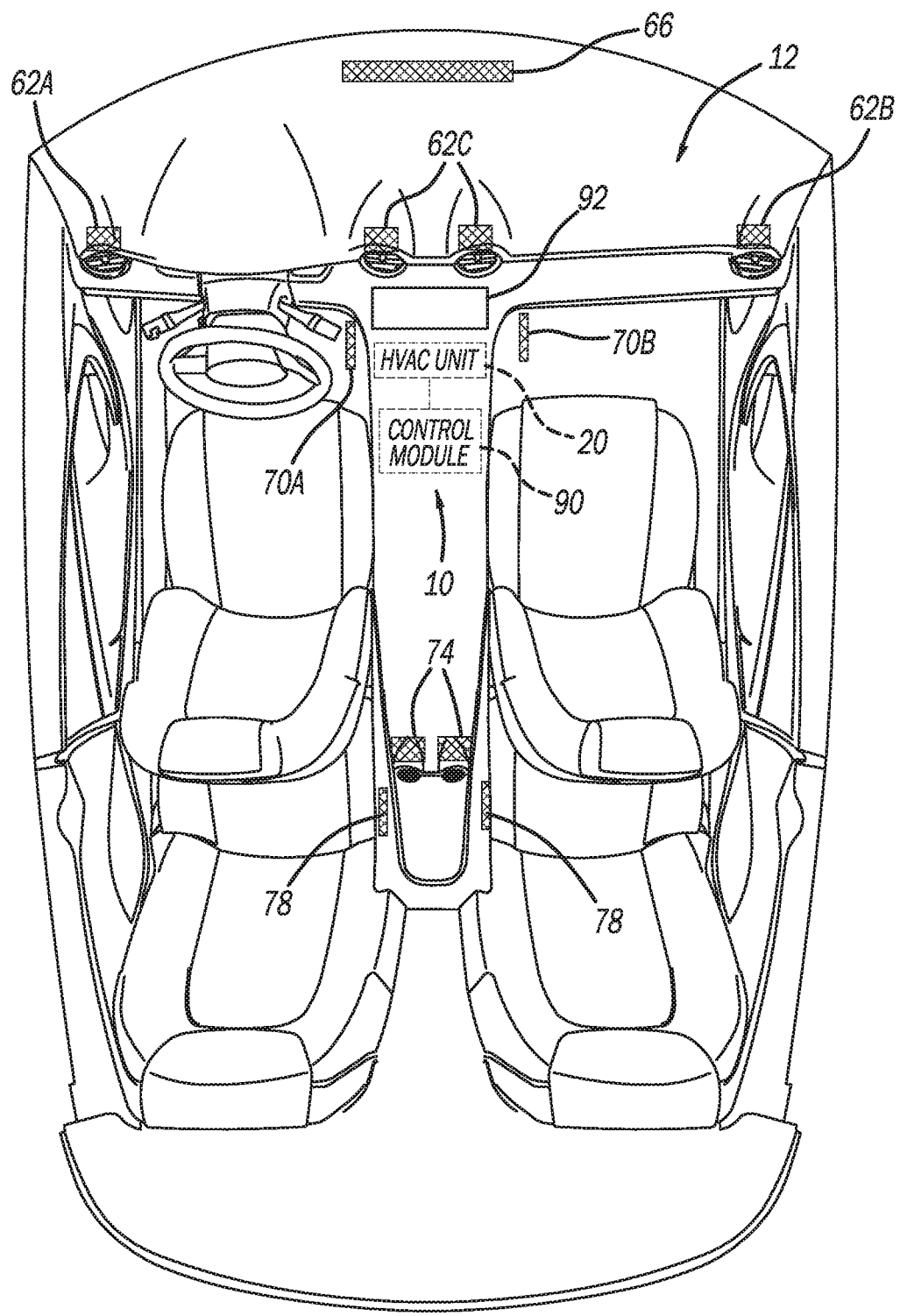
FIG. 1 illustrates a vehicle passenger cabin including a heating, ventilation, and air conditioning (HVAC) system in accordance with the present teachings.
Figure 2:
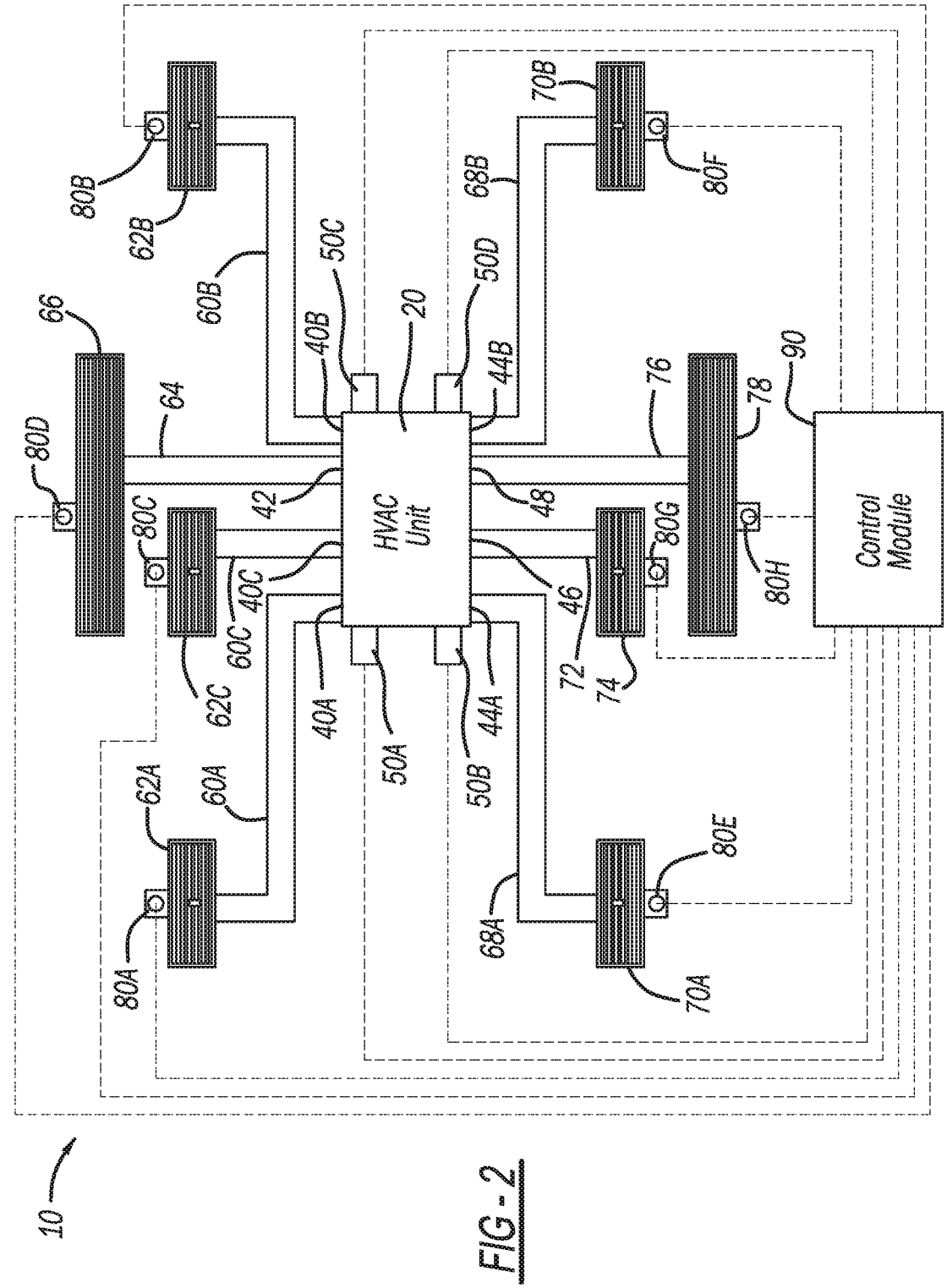
FIG. 2 illustrates the HVAC system according to the present teachings.

FIGS. 1 and 2 illustrate a heating, ventilation, and air conditioning (HVAC) system in accordance with the present teachings at reference numeral 10. In the example illustrated in FIG. 1, the HVAC system 10 is installed within a passenger cabin 12 of an exemplary vehicle. Although FIG. 1 illustrates the HVAC system 10 installed in a passenger cabin 12 of a passenger vehicle, the HVAC system 10 can be installed in any other suitable vehicle, such as a mass transit vehicle, recreational vehicle, military vehicle, construction equipment, watercraft, aircraft, etc. The HVAC system 10 can also be used with any suitable non-vehicular application.

Figure 3:
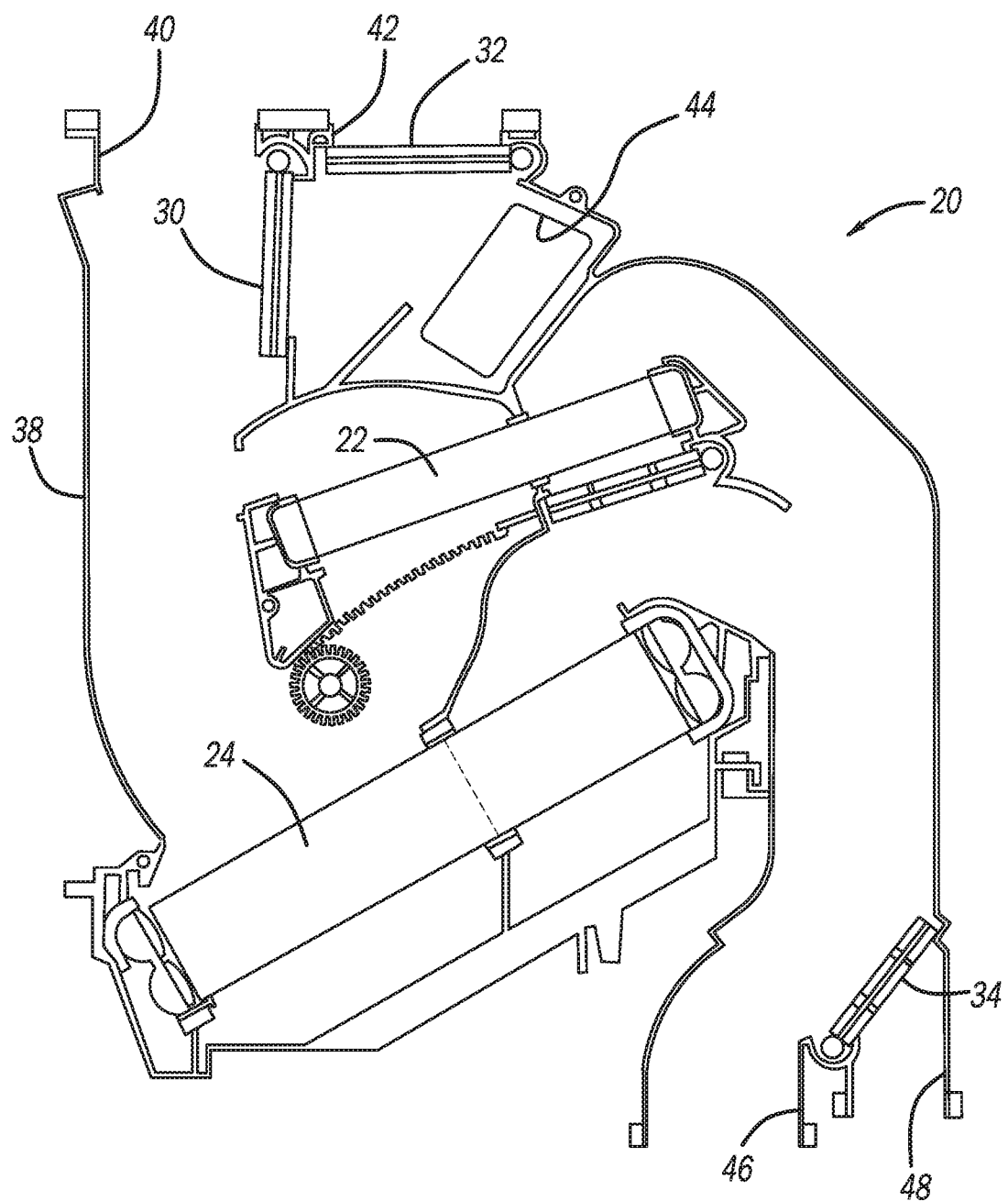
FIG. 3 is a cross-sectional view of an HVAC case of the HVAC system according to the present teachings.

The HVAC system 10 includes an HVAC unit 20. With particular reference to FIG. 3, the HVAC unit 20 includes a heater core 22 for heating airflow, and an evaporator 24 for cooling airflow. Any suitable number of mode doors are included with the HVAC unit 20 for controlling airflow emanating from the HVAC unit 20. In the example illustrated in FIG. 3, the HVAC unit 20 includes a first mode door 30, a second mode door 32, and a third mode door 34. The mode doors can be arranged in any suitable manner. In the example illustrated, first mode door 30 controls airflow exiting the HVAC unit 20 through a face outlet 40 defined by a case 38 of the HVAC unit 20. The second mode door 32 controls airflow exiting a defrost outlet 42 and a foot outlet 44 of the case 38. The third mode door 34 is movable to control airflow exiting the case 38 through a rear face outlet 46 and a rear foot outlet 48 of the case 38.

The mode doors 30, 32, and 34 are controlled (in this example rotated) by any suitable servos (servomechanisms) 50A-50C, which are illustrated in FIG. 2. The mode doors 30, 32, and 34 are connected to the servos 50A, 50B, and 50C respectively in any suitable manner, such as with a gear and shaft connection. Specifically, first servo 50A is connected to the first mode door 30 to rotate the first mode door 30. Second servo 50B is connected to the second mode door 32 to rotate the second mode door 32. Third servo 50C is connected to the third mode door 34 to rotate the third mode door 34. In some applications, a single servo can be configured to operate more than one of the mode doors 30, 32, and 34.

With particular reference to FIGS. 1 and 2, the HVAC unit 20, and specifically the case 38 thereof, can be connected to a plurality of air ducts for directing airflow to various different air duct outlets arranged about the passenger cabin 12. Specifically, air ducts 60A, 60B, and 60C can be connected to the face outlet 40 of the case 38 for directing airflow to face air duct outlets 62A, 62B, and 62C. The air ducts 60A, 60B, and 60C can each be connected to the face outlet 40. As illustrated in FIG. 2, the face outlet 40 can be divided into multiple face outlets 40A, 40B, and 40C defined by the case 38, to which the air ducts 60A, 60B, and 60C can be respectively connected to.

Connected to the defrost outlet 42 of the case 38 is an air duct 64, which directs airflow to defrost air duct outlet 66. Connected to the foot outlet 44 are air ducts 68A and 68B. Air ducts 68A and 68B can both be connected to the foot outlet 44. As illustrated in FIG. 2, the foot outlet 44 may also be divided into a first foot outlet 44A to which duct 68A is connected, and a second foot outlet 44B to which duct 68B is connected. Duct 68A directs airflow to foot air duct outlet 70A, and air duct 68B directs airflow to foot air duct outlet 70B. Air duct 72 is connected to rear face outlet 46 of the case 38, and directs airflow to a rear face air duct outlet 74. Air duct 76 is connected to the rear foot outlet 48, and directs airflow exiting the rear foot outlet 48 to rear foot air duct outlet 78.

Associated with each one of the air duct outlets is an airflow sensor suitable for measuring airflow amount (i.e., volume for example) exiting each one of the air duct outlets 62A, 62B, 62C, 66, 70A, 70B, 74 and 78. Specifically and as illustrated in FIG. 2: airflow sensor 80A is at face air duct outlet 62A; airflow sensor 80B is at face air duct outlet 62B; airflow sensor 80C is at face air duct outlet 62C; airflow sensor 80D is at defrost air duct outlet 66; airflow sensor 80E is at foot air duct outlet 70A; airflow sensor 80F is at foot air duct outlet 70B; airflow sensor 80G is at rear face air duct outlet 74; and airflow sensor 80H is at rear foot air duct outlet 78.

The HVAC system 10 further includes a control module 90. In this application, the term "control module" may be replaced with the term "circuit," The term "control module" may refer to, be part of, or include processor hardware (shared, dedicated, or group) that executes code and memory hardware (shared, dedicated, or group) that stores code executed by the processor hardware. The code is configured to provide the features of the control module 90, and the HVAC system 10 generally, described herein.

The control module 90 is connected to, and individually controls, each one of the servos 50A, 50B, and 50C in order to individually control the first mode door 30, the second mode door 32, and the third mode door 34. The control module 90 also receives inputs from each one of the airflow sensors 80A-80H. Based on these inputs, the control module 90 is configured to measure and determine the amount of airflow flowing through each one of the air duct outlets 62A, 62B, 62C, 66, 70A, 70B, 74, and 78.

The control module 90 identifies the overall airflow distribution pattern by identifying the airflow amount at each one of the air duct outlets 62A, 62B, 62C, 66, 70A, 70B, 74, and 78 based on the inputs from the airflow sensors 80A, 80B, 80C, 80D, 80E, 80F, 80G, and 80H, and actively changes the operational angles of one or more of the servos 50A, 50B, and/or 50C (thereby changing the angles of one or more of the mode doors 30, 32, and/or 34) to achieve a desired overall airflow distribution pattern. The desired airflow distribution can be input to the control module 90 in any suitable manner, such as with any suitable user interface 92, which is illustrated as a touch screen in the example of FIG. 1. The desired airflow distribution can be customized by the user for one or more of the modes of operation, such as the face mode, foot mode, defrost mode, etc.

Figure 4:
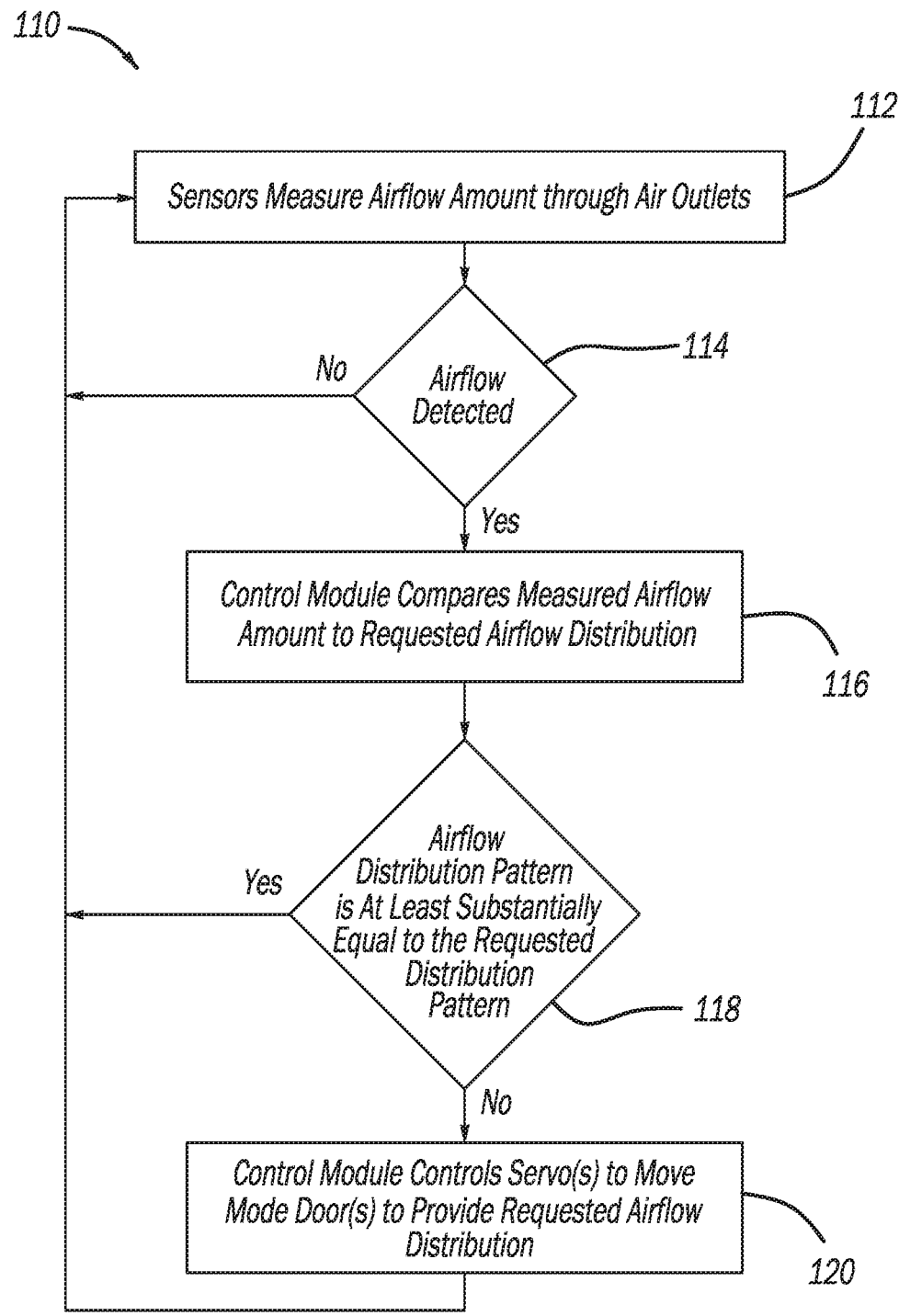
FIG. 4 illustrates a method in accordance with the present teachings for controlling airflow through an HVAC system.

With additional reference to FIG. 4, a method 110 in accordance with the present teachings for controlling airflow through an HVAC system is illustrated. The method 110 is described as being performed by the HVAC system 10 for exemplary purposes only; the method 110 can be performed by any other suitable HVAC system as well. With reference to block 112, the airflow sensors 80A-80H measure airflow amount through the air duct outlets 62A, 62B, 62C, 66, 70A, 70B, 74, and 78. At block 114, if airflow is detected the method 110 proceeds to block 116, but otherwise returns to block 112. The airflow amount measurements are input to the control module 90, which compares the measured airflow amounts to airflow distribution requested by a user, such as in any one of a face mode, foot mode, defrost mode, etc. of the HVAC system 10 at block 116. At block 118, the control module 90 determines whether the airflow distribution pattern is at least substantially equal to the requested pattern. If the determination at block 118 is negative, then the method 110 proceeds to block 120, but otherwise the method 110 returns to block 112. The control module 90 then controls one or more of the servos 50A, 50B, and/or 50C to move one or more of the mode doors 30, 32, and/or 34 to provide the requested airflow distribution at block 120. The method 110 then returns to block 112. Thus, data from the airflow sensors 80A-80H advantageously provides continuous feedback to the control module 90, so that the control module 90 can adjust the positions of one or more of the mode doors 30, 32, and/or 34 to provide the airflow distribution requested by the user. This continuous feedback advantageously results in the mode doors 30, 32, and/or 34 being properly positioned at all times to provide the requested airflow.

The present teachings provide for numerous advantages. For example, data from the airflow sensors 80A-80H advantageously provides continuous feedback to the control module 90. The control module 90 then adjusts the positions of one or more of the mode doors 30, 32, and/or 34 in order to meet a wide range of airflow distribution targets that can be set by the user. Additionally, a memory set of predetermined door angles of one or more of the mode doors 30, 32, and/or 34 for particular airflow distributions may be created by a user based on their own personal preferences and/or needs.

Additional potential advantages of the present teachings include the reduction of iterative linkage development time to meet varying airflow distribution patterns because specific linkage designs do not need to be created. To achieve door control suitable for application with the present teachings, a gear-to-shaft servo connection (or other suitable connection) to the door may be used. Gear-to-shaft door operation can allow for smoother door operation and reduce the occurrence of undesirable noises (i.e., click, thump, flutter, etc.). Currently, original equipment manufacturers set the percentage of airflow distributed through each outlet 40, 42, 44, 46, and 48 of the case 38 by setting the door linkages to properly position the mode doors 30, 32, and/or 34 to provide the predetermined airflow pattern. Thus the user can only select from a small number of predetermined airflow patterns, which is in contrast to the theoretically infinite airflow patterns that the present teachings make available to the end user. In addition, customizable airflow distribution ranges can be preprogrammed for the end user to adjust to their liking, rather than having a single-predesigned mode door angle for each mode setting.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) system comprising:
    an HVAC unit including an HVAC case, the HVAC case including: a heater core within the HVAC case, an evaporator within the HVAC case, a plurality of mode doors within the HVAC case that control airflow from the HVAC unit, and one or more actuators, each one of the one or more actuators moves one or more of the plurality of mode doors;
    a plurality of air duct outlets through which airflow from the HVAC unit flows, the plurality of air duct outlets are spaced apart from the HVAC case and connected to the HVAC case by way of air ducts, the plurality of air duct outlets are within a passenger cabin of a vehicle and include a plurality of face outlets, foot outlets, and defrost outlets;
    a plurality of airflow sensors, each one of the plurality of airflow sensors is associated with different one of the plurality of air duct outlets to measure airflow therethrough;
    a user interface configured to accept inputs from a user customizing a first airflow distribution through each one of the plurality of face outlets, foot outlets, and defrost outlets for a foot mode, and customizing a second airflow distribution through each one of the plurality of face outlets, foot outlets, and defrost outlets for a face mode; and
    a control module that determines airflow amount through each one of the plurality of air duct outlets based on inputs received from the sensors, and moves one or more of the plurality of mode doors until airflow amount measured by the plurality of airflow sensors is at least substantially equal to the first airflow distribution when the HVAC unit is in the foot mode and the second airflow distribution when the HVAC unit is in the face mode.

2. The HVAC system of claim 1, wherein each one of the one or more actuators includes a servomechanism mounted to the HVAC case.

3. The HVAC system of claim 1, wherein the plurality of air duct outlets further include rear face and rear foot outlets.

4. The HVAC system of claim 1, wherein the plurality of mode doors include: a face outlet mode door; a defrost outlet mode door; and a rear airflow mode door.

5. A heating, ventilation, and air conditioning (HVAC) system comprising:
    an HVAC unit including an HVAC case, the HVAC case including: a heater core within the HVAC case, an evaporator within the HVAC case, a plurality of mode doors within the HVAC case that control airflow from the HVAC unit, and one or more actuators, each one of the one or more actuators moves one or more of the plurality of mode doors, the plurality of mode doors include a face outlet mode door, a defrost outlet mode door, and a rear airflow mode door;

a plurality of air duct outlets through which airflow from the HVAC unit flows, the plurality of air duct outlets are spaced apart from the HVAC case and connected to the HVAC case by way of air ducts, the plurality of air duct outlets are within a passenger cabin of a vehicle and include a plurality of face outlets, foot outlets, and defrost outlets;

a plurality of airflow sensors, each one of the plurality of airflow sensors is associated with different one of the plurality of air duct outlets to measure airflow therethrough;

a user interface configured to accept inputs from a user customizing a first airflow distribution through each one of the plurality of face outlets, foot outlets, and defrost outlets for a foot mode, and customizing a second airflow distribution through each one of the plurality of face outlets, foot outlets, and defrost outlets for a face mode; and a control module that determines airflow amount through each one of the plurality of air duct outlets based on inputs received from the sensors, and moves one or more of the plurality of mode doors until airflow amount measured by the plurality of airflow sensors is at least substantially equal to the first airflow distribution when the HVAC unit is in the foot mode and the second airflow distribution when the HVAC unit is in the face mode.

\* \* \* \* \*